United States Patent [19]

Valtiero

[11] Patent Number: 4,754,535
[45] Date of Patent: Jul. 5, 1988

[54] METHOD AND MACHINE FOR THE EMBELLISHMENT OF PRECOINED METAL STRIP, UTILIZING CONTINUOUS STOCK OR DISCRETE LENGTHS

[76] Inventor: Tizzi Valtiero, Via Clementini, 2, 47037 Rimini (Forli'), Italy

[21] Appl. No.: 859,030

[22] Filed: May 2, 1986

[51] Int. Cl.⁴ .......................... B23P 23/04; B21F 43/00
[52] U.S. Cl. .................................... 29/33 S; 29/160.6; 72/465
[58] Field of Search ............... 29/33 S, 160.6; 72/369, 72/462, 465; 269/7

[56] References Cited

U.S. PATENT DOCUMENTS

| 1,802,033 | 4/1931 | Parker | 29/33 S |
| 4,059,000 | 11/1977 | Bodnar | 72/465 |

FOREIGN PATENT DOCUMENTS

| 2428647 | 1/1975 | Fed. Rep. of Germany | 269/7 |
| 897688 | 3/1970 | Italy | |
| 954255 | 4/1972 | Italy | |
| 1005271 | 1/1974 | Italy | |
| 1108223 | 12/1978 | Italy | |
| 1133479 | 8/1980 | Italy | |
| 12434 A/84 | 2/1984 | Italy | |
| 58-143930 | 8/1983 | Japan | 269/7 |
| 60-34236 | 2/1985 | Japan | 269/7 |

Primary Examiner—P. W. Echols
Attorney, Agent, or Firm—Birch, Stewart, Kolasch & Birch

[57] ABSTRACT

The invention relates to the art field of machines for the manufacture of jewelry, and has as its object the embodiment of a machine and the provision of a method that will permit embellishing precoined metal strip, using either continuous stock or discrete lengths. Such a machine makes use of a support on which to position the strip, a packing medium with which to bolster the coined imprints and protect the support, a method for tensioning the strip, and tools, and enables crafting of the embellishment quickly and economically by virtue of the design of the support, which is substantially circular, split into identical and symmetrical halves, and composed of a base and an intermediate layer. This intermediate layer is embodied in an insulating material, and incorporates open-topped channels which accommodate small-bore tube for the circulation of refrigerant and is covered over by a permeable barrier strip. Water injected via the channels into the coined imprints of the strip is frozen by the refrigerant in such a way as to form ice, the packing material by means of which the requisite support and protection are obtained according to the method disclosed.

7 Claims, 2 Drawing Sheets

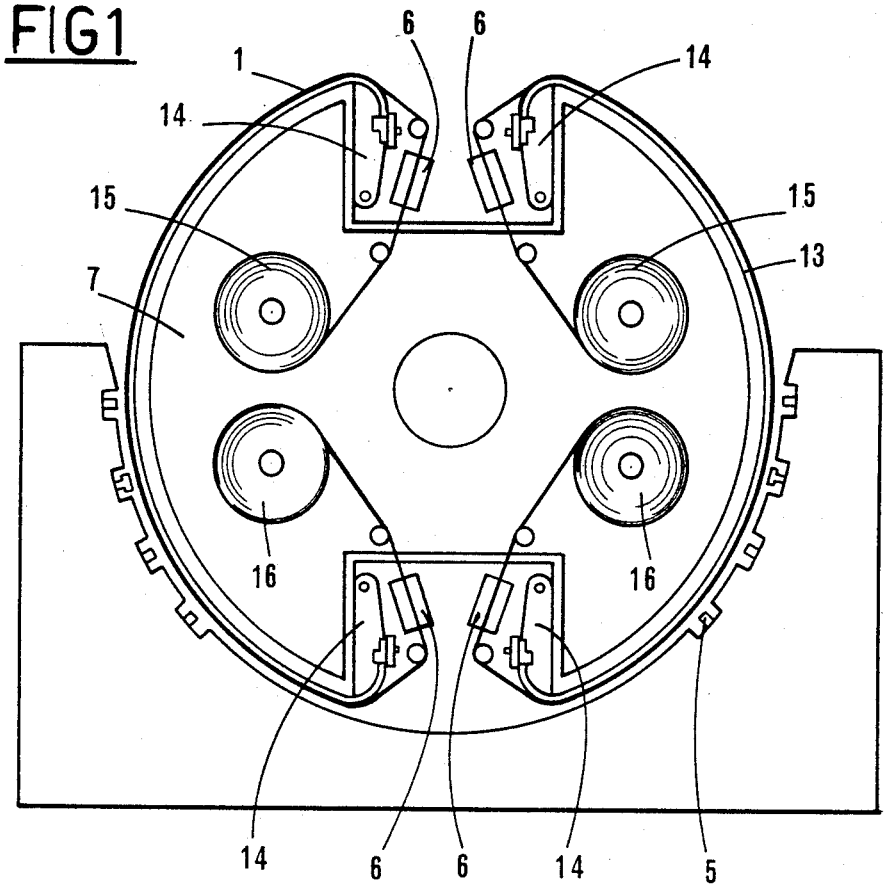
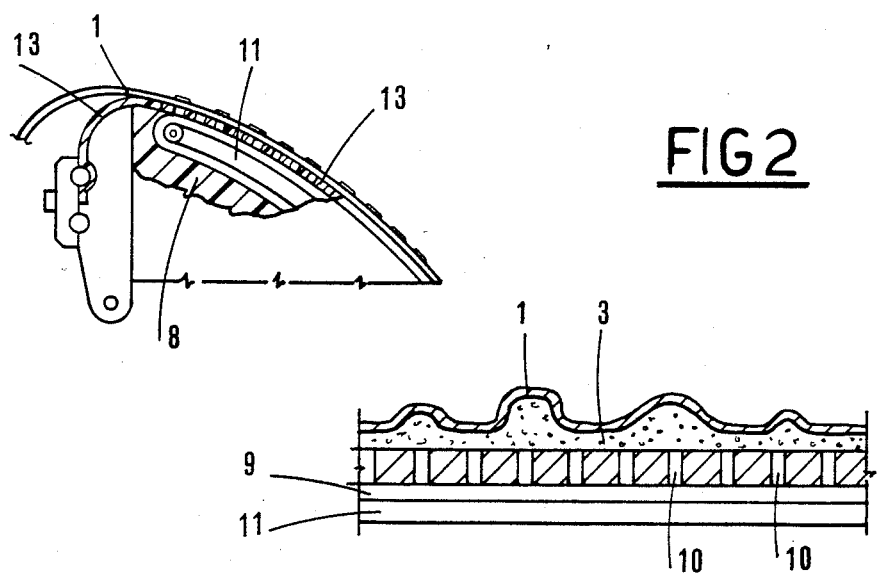

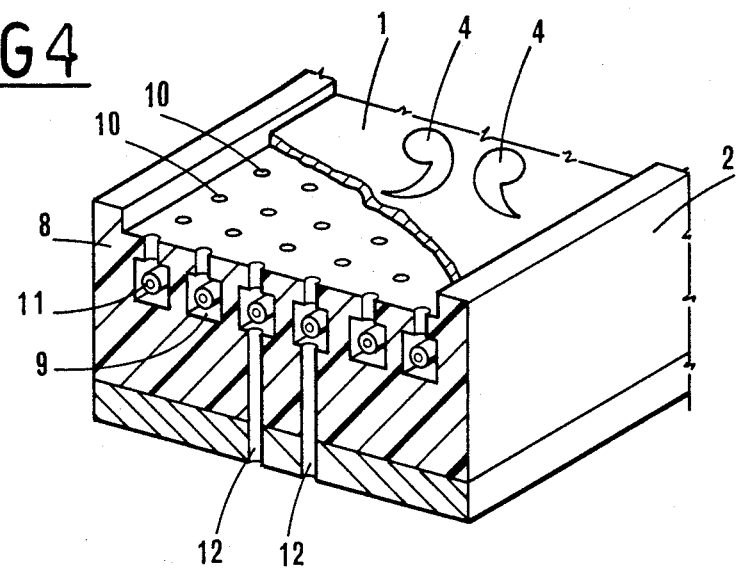
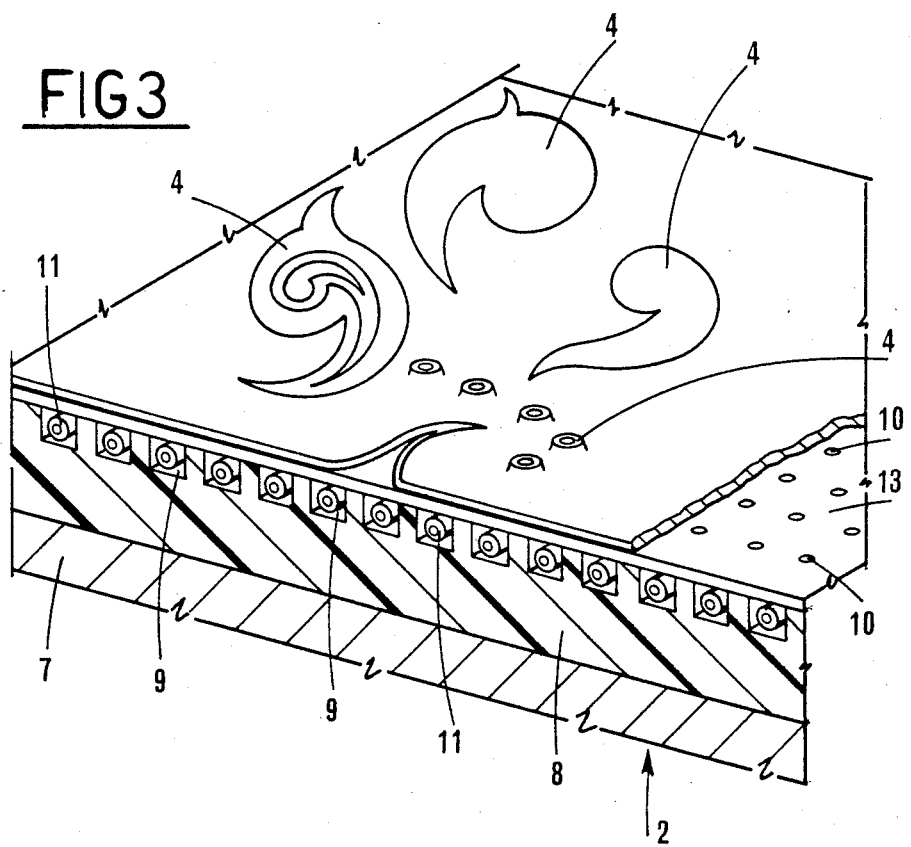

METHOD AND MACHINE FOR THE EMBELLISHMENT OF PRECOINED METAL STRIP, UTILIZING CONTINUOUS STOCK OR DISCRETE LENGTHS

BACKGROUND OF THE INVENTION

The invention relates to a method and a machine for the mechanical embellishment, including fine perforation, of precoined metal strip, working from continuous stock or from discrete lengths.

Prior art methods of manufacturing precious metal and costume jewelry embrace machines which are capable of turning out items in a variety of shapes, with a specular embellishment obtained by machining. Certain of these machines, on which rights are also claimed by the same applicant, produce the specular machined embellishment on rolled materials tensioned longitudinally over rotary supports.

In other types of machines, on which rights are similarly claimed by the same applicant, items exhibiting a specular embellishment produced by synchronized mechanical cutting are obtained from a strip of geometrically defined width, gripped either side, which, following embellishment, are coined and then embellished further over the coined areas. The items are then separated by shearing through the strip in readiness for further finishing operations.

Those machines employed, in particular, for the specular embellishment and subsequent coining of items piece by piece, include a support that will grip and tension the previously formed material, the surface of which can then be machined at a series of rotary tool stations.

It is common practice when using such machinery to employ a packing, located between the support and the sheared and formed piece of material, which serves a dual purpose of affording a cushion to the coined imprints, and avoiding contact between the tools and the support. The use of packing material is of great importance, not only in protecting those parts of the support embodied in relief, but also in assisting embellishment, generally implemented with rotary tools. Its effect is to permit a cleaner, more specular machining, while preventing the strip material from vibrating at the point where the tool cuts into the coined imprint.

The packing providing support and protection in this way must necessarily be replaced each time the work is changed, in order to prevent a tool from penetrating the hollow of an imprint and thus damage the work as a result of its being subjected to jerking and vibration from the tool itself.

With such a requirement in mind, packing is currently fashioned in a plastic or paper material and pre-compressed in a mold. Though the costs are high, especially when one considers that in order to perform the function in question, the shape must be altered in each instance to match the profile of the work.

Aside from the drawback of cost, the use of packing as referred to is also beset by a practical disadvantage, inasmuch as a given strip may exhibit a number of dissimilar coined imprints, or differing layout of such imprints, along its length, in which case the packing must exhibit the same pattern.

The object of the invention is to eliminate the drawbacks aforementioned.

SUMMARY OF THE INVENTION

The question of discovering a method for the embellishment of precoined metal strip exhibiting standard or somewhat larger dimensions, whether continuous or in discrete lengths, and of embodying a machine for its implementation, is one which finds response in the invention as disclosed and claimed herein.

Advantages provided by the invention include the fact that one eliminates problems connected with coining or otherwise shaping packing material to be located between the metal strip and the support of the machine, which bolsters the one and protects the other, respectively.

Likewise, an advantage of the invention is the fact of dispensing with large and costly stocks of standard packing material, inasmuch as the packing is fashioned in each instance prior to carrying out the finely perforated embellishment.

A further advantage of the invention lies in the fact that the packing material, which is ice, requires no removal operation at the close of each work cycle, since it will melt automatically during machining and embellishment due to swift reversal of the effect of cooling.

Another advantage of the invention is that one eliminates the problem of holding down the strip at either side, since moisture trapped between the tensioned metallic surfaces following formation of the ice provides optimum grip over the entire surface area of the strip.

Yet another advantage of the invention is that it permits applying a specular embellishment to a wide and to a narrow strip alike. Pin-holes in the support not concealed by a narrow strip can either be masked off with an additional strip or even left open, since the bore of such holes is so minute as to allow the passage of water without any damage occurring. Only a minimal amount of time is required for freezing to take place, hence to occasion automatic blockage of the holes or of the porous metal through which water is allowed to permeate.

An additional advantage of the invention, stemming from an another essential feature, is that the machine is divided into two identical and substantially semicircular halves in order that strip can be tensioned without difficulty—viz, the length of workable strip is considerable, whilst the length subjected to tension is limited, avoiding sliding friction that cound hamper optimum tension.

The use of ice is embraced by the prior art in this field, though for purposes and with results totally different to those disclosed herein. Ice was used formerly as a clamping medium by means of which to fasten together concatenated articles on rotary cylindrical supports, often of considerable dimensions: water would be sprayed over the concatenated article, which would be tensioned by hand over the cylinder and made fast at either end, then frozen by refrigeration means inside the cylinder; this accomplished, the cylinder would be rotated at high speed so as to permit of machine-turning the article with a fixed tool, the article itself being held fast by the ice formed on the surface of the cylinder.

BRIEF DESCRIPTION OF THE DRAWINGS

The invention will now be described in detail and by way of example with the aid of the accompanying sheet of drawings, in which:

FIG. 1 is a schematic representation of a machine according to the invention, viewed in side elevation;

FIG. 2 shows a detail of the machine in FIG. 1 on enlarged scale, namely, the section through one of the channels with which it is provided;

FIG. 3 is a perspective of the detail shown in FIG. 2;

FIG. 4 is the perspective of a different embodiment of the detail of FIG. 3.

DESCRIPTION OF THE PREFERRED EMBODIMENT

It will be observed from FIG. 1 that a machine for the embellishment of precoined metal strip includes a support 2, which carries the strip 1, means 6 for tensioning the strip over the support 2, and a set of tools 5. Such a machine will handle a strip either in continuous format or in discrete lengths.

According to the invention, the support 2 is composed of a base 7, and an intermediate layer 8 fashioned from insulating material. A seal (not illustrated) is located between each such base 7 and insulating layer 8, for a purpose which will become apparent. An embodiment of the intermediate layer 8 in insulating material is of considerable importance, since this protects the base 7 from sharp variations in temperature, and from dampness, to which it would otherwise be subject.

The intermediate layer 8 incorporates a set of channels 9 disposed parallel one with the next, and with the longitudinal dimension of the strip 1. These channels 9 communicate by way of ducts 12 with a source of freezable liquid, in effect with a supply of water (not illustrated), located internally of the base 7. Each channel 9 is served by a relative duct 12, the ducts in turn being routed into a manifold (not illustrated) connecting with the water supply.

In an alternative though equally functional embodiment, one or two ducts 12 only might be provided, communicating each with a relative channel 9, in which case the remaining channels would be interconnected by way of further transverse channels (not illustrated).

Numeral 11 denotes a small-bore tube accommodated by the channels 9, through which a refrigerant is circulated from a common source (not illustrated).

It will be observed from FIGS. 2 and 3 that the open top of each single channel 9 is offered to the strip 1, and that the channels are covered by a barrier strip 13 which can be permeated by water and is afforded uniform support by the tops of the channel walls (see FIG. 3). The barrier strip 13 exhibits a pattern of pin-holes 10 arranged in alignment with the channels 9 and giving out onto the underside of the strip 1. A close fit between the barrier strip 13 and the top of the channels 9 is ensured by appropriate tensioning means 14.

In the embodiment of FIG. 4, the channels 9 are embedded in the intermediate layer 8, and permeability of the outermost surface 13, against which the strip 1 is tensioned, is obtained by providing pin-holes 10 in the material 8 which give out onto the underside of the strip 1. In this particular embodiment, the intermediate layer might incorporate one channel 9 only rather than a set as illustrated.

Another essential feature of the invention is that the support 2 is substantially circular (see FIG. 1) and split into identical halves disposed symmetrically either side of a vertical axial plane. Each half of the machine will be provided with identical components, and may operate independently of the other. In addition, each half will incorporate means 15 for indexing the strip 1, and means 16 for its take-up following embellishment.

In such an embodiment of a machine, according to the invention, the intermediate layer 8 is split transversely into a number of sections, with seals (not illustrated) located at each join in order to prevent water from penetrating through to the base.

The machine will also be provided with conventional means (not illustrated) for positioning the strip 1 and for detecting reference marks in the strip itself, and with other components besides.

With a machine thus embodied, and made to operate according to the method disclosed, the metal strip 1 is indexed through the prescribed distance following each machining step. On reaching the new position, the strip 1 is tensioned by operation of the relative means 6, wherein water is directed into the single or several channels 9 (depending on the particular embodiment). The water then passes through the barrier strip 13 (FIGS. 1, 2 and 3) or through the outermost surface 13 of the intermediate layer 8 (FIG. 4), filling the coined imprints 4 in the strip 1 and expelling air therefrom; refrigerant is then circulated through the small-bore tube 11, and the water duly freezes. The ice which forms thus creates a packing layer 3 between the intermediate layer 8 and the strip 1, affording support to the strip during operation of the tools 5 which produce the embellishment, and protecting the intermediate layer 8 from the tools 5 at the same time.

Formation of the ice also has the effect of blocking any pin-holes 10 that may remain uncovered by a strip 1 of width narrower thant he intermediate layer 8, though the option likewise exists of masking off parts of the layer which are left bare by employing one or more additional blank strips (not illustrated).

As machining progresses, the ice maintains the tools 5 below a given temperature while melting gradually under the heat produced, so that completion of the work will see the ice completely melted, and the machine ready for a fresh cycle. The step of removing a solid packing 3 is thus dispensed with completely. Melting of the ice can be speeded up, if necessary, by reversing the refrigeration cycle.

With machining terminated, the coined imprints 4 will exhibit the embellishment selected, which might appear as denoted 4' in FIG. 3.

What is claimed is:

1. A method for the embellishment of a precoined metal strip, utilizing a continuous metal stock or a metal strip of a discrete length having 'coined imprints thereon, comprising the steps of:

positioning said continuous metal stock or said metal strip of a discrete length having coined imprints thereon onto a support;

tensioning said continuous metal stock or said metal strip of a discrete length over the support;

injecting a freezable liquid between the continuous metal stock or the metal strip of a discrete length and the support until said coined imprints on said continuous metal stock or said metal strip of a discrete length are filled and subsequent freezing of said liquid; and embellishing the continuous metal stock or metal strip of a discrete length.

2. A machine for the embellishment of a precoined metal strip, utilizing a continuous metal stock or a metal strip of a discrete length, comprising:

a support on which to position a continuous or a discrete length of a precoined strip, composed of a base, and an intermediate layer fashioned from insulating material and provided with at least one channel having an open top, said open top of said support being directed toward the strip and communicates with the surrounding atmosphere by way of a permeable barrier;

a small-bore tube accommodated by each such channel and connected with a source of refrigerant; and means for tensioning the strip, and tools for embellishment of said strip.

3. The machine as in claim 2, wherein said channel is embedded in an intermediate layer of insulating material such that a permeable barrier is constituted by the topmost part of the intermediate layer itself, the intermediate layer is provided with pin-holes protruding toward the underside of the strip, and the permeable barrier affords uniform support to the strip.

4. The machine as in claim 2, comprising a number of channels having open tops which are open to the strip, though covered by said permeable barrier embodied as a strip provided with pin-holes and supported uniformly from beneath by the channel walls.

5. The machine as in claim 2, wherein the support is arched.

6. The machine as in claim 5, wherein the support is substantially circular, and split into two identical halves disposed symmetrically on either side of a vertical axial plane.

7. The machine as in claim 2, wherein the intermediate layer is embodied as a number of distinct sections disposed one adjacent to the next and separated by seals.

* * * * *